(12) United States Patent
Hu et al.

(10) Patent No.: US 12,120,018 B2
(45) Date of Patent: *Oct. 15, 2024

(54) METHOD AND APPARATUS FOR PROCESSING TRANSMISSION PATH FAULT, AND SYSTEM

(71) Applicant: Huawei Technologies Co., Ltd., Shenzhen (CN)

(72) Inventors: Zhibo Hu, Beijing (CN); Junda Yao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/338,450

(22) Filed: Jun. 21, 2023

(65) Prior Publication Data

US 2023/0353490 A1    Nov. 2, 2023

Related U.S. Application Data

(63) Continuation of application No. 17/137,015, filed on Dec. 29, 2020, now Pat. No. 11,722,401, which is a
(Continued)

(30) Foreign Application Priority Data

Jun. 30, 2018    (CN) .......................... 201810703248.2

(51) Int. Cl.
*H04L 45/28* (2022.01)
*H04L 45/00* (2022.01)
(Continued)

(52) U.S. Cl.
CPC .............. *H04L 45/28* (2013.01); *H04L 45/20* (2013.01); *H04L 45/22* (2013.01); *H04L 45/507* (2013.01); *H04L 45/745* (2013.01)

(58) Field of Classification Search
None
See application file for complete search history.

(56) References Cited

U.S. PATENT DOCUMENTS 8,259,564 B1    9/2012 Gredler et al.
8,958,286 B1 *  2/2015 Atlas ..................... H04L 12/18
                                                      370/227
(Continued)

FOREIGN PATENT DOCUMENTS

CN         102006218 A       4/2011
CN         105049350 A      11/2015
(Continued)

OTHER PUBLICATIONS

3GPP tsg_sa\WG4_CODEC, Aug. 17, 2004, 40 pages.
(Continued)

*Primary Examiner* — Phirin Sam
(74) *Attorney, Agent, or Firm* — Slater Matsil, LLP

(57) ABSTRACT

This application discloses a method, an apparatus, and a system for processing a transmission path fault. In this application, after a first network device receives a packet, and when the first network device determines that a third network device is faulty, a difference between an initial value of a segment routing global block SRGB of the first network device and an initial value of an SRGB of the third network device is determined, and a backup path is determined based on the difference and a backup forwarding table. The first network device sends a first packet based on the backup forwarding table.

18 Claims, 8 Drawing Sheets

Related U.S. Application Data continuation of application No. PCT/CN2019/091497, filed on Jun. 17, 2019.

(51) Int. Cl.
*H04L 45/50* (2022.01)
*H04L 45/745* (2022.01)

(56) References Cited

U.S. PATENT DOCUMENTS

| | | | |
|---|---|---|---|
| 9,077,561 B2* | 7/2015 | Kotrabasappa | H04L 45/28 |
| 9,124,511 B2* | 9/2015 | Olofsson | H04L 45/28 |
| 9,787,573 B2* | 10/2017 | Singh | H04L 45/28 |
| 9,794,148 B1 | 10/2017 | Ramachandran et al. | |
| 9,838,246 B1 | 12/2017 | Hegde et al. | |
| 10,992,574 B2 | 4/2021 | Peng et al. | |
| 11,722,401 B2* | 8/2023 | Hu | H04L 45/507 |
| | | | 370/218 |
| 2011/0280123 A1 | 11/2011 | Wijnands et al. | |
| 2013/0077476 A1 | 3/2013 | Enyedi et al. | |
| 2015/0109904 A1 | 4/2015 | Filsfils et al. | |
| 2015/0172070 A1 | 6/2015 | Császár | |
| 2015/0244615 A1 | 8/2015 | Esale | |
| 2015/0326675 A1 | 11/2015 | Kini et al. | |
| 2016/0173366 A1 | 6/2016 | Saad et al. | |
| 2016/0191374 A1 | 6/2016 | Singh et al. | |
| 2016/0241463 A1 | 8/2016 | D'Souza et al. | |
| 2016/0254991 A1 | 9/2016 | Eckert et al. | |
| 2017/0033939 A1 | 2/2017 | Bragg et al. | |
| 2017/0331727 A1 | 11/2017 | Ryoo et al. | |
| 2017/0373966 A1 | 12/2017 | Liao et al. | |
| 2018/0006932 A1* | 1/2018 | Vasseur | H04L 45/28 |
| 2018/0041420 A1 | 2/2018 | Saad et al. | |
| 2018/0077051 A1 | 3/2018 | Nainar et al. | |
| 2019/0036717 A1 | 1/2019 | Kebler et al. | |
| 2019/0081897 A1 | 3/2019 | Shakir et al. | |
| 2019/0305988 A1 | 10/2019 | Bickhart et al. | |

FOREIGN PATENT DOCUMENTS

| | | |
|---|---|---|
| CN | 105282028 A | 1/2016 |
| CN | 105337785 A | 2/2016 |
| CN | 105704021 A | 6/2016 |
| CN | 105991437 A | 10/2016 |
| CN | 107864091 A | 3/2018 |
| JP | 2015515827 A | 5/2015 |
| JP | 2017034365 A | 2/2017 |
| WO | 2015173669 A1 | 11/2015 |
| WO | 2016115850 A1 | 7/2016 |
| WO | 2017118880 A1 | 7/2017 |

OTHER PUBLICATIONS

Filsfils, C., et al., "Segment Routing with MPLS data plane draft-filsfils-spring-segment-routing-mpls-03", Network Working Group, Internet-Draft, Intended status: Standards Track, Expires: Feb. 1, 2015, Jul. 31, 2014, 14 Pages.

Filsfils, C., et al., "Segment Routing Use Cases draft-filsfils-spring-segment-routing-use-cases-01", Network Working Group, Internet-Draft, Intended status: Standards Track, Expires: Apr. 24, 2015, Oct. 21, 2014, 35 Pages.

Hegde, S., et al., "Node Protection for SR—TE Paths draft-hegde-spring-node-protection-for-sr-te-paths-02", Routing area, Internet-Draft, Intended status: Informational, Expires: May 3, 2018, Oct. 30, 2017, 15 Pages.

Kunyu, F., "5G Bearer Big Connection Solution: Segment Routing Research", Communication Design and Application, Jan. 2018, with the English Abstract, 3 pages.

Vasseur, J.P., et al., "IGP Routing Protocol Extensions for Discovery of Traffic Engineering Node Capabilities", Network Working Group, Request for Comments: 5073, Category: Standards Track, Dec. 2007, 13 Pages.

\* cited by examiner

METHOD AND APPARATUS FOR PROCESSING TRANSMISSION PATH FAULT, AND SYSTEM

CROSS-REFERENCE TO RELATED APPLICATIONS

This application is a continuation of U.S. patent application Ser. No. 17/137,015, filed on Dec. 29, 2020, now U.S. Pat. No. 11,722,401 issued on Aug. 8, 2023, which is a continuation of International Application No. PCT/CN2019/091497, filed on Jun. 17, 2019, which claims priority to Chinese Application No. 201810703248.2, filed on Jun. 30, 2018. All of the aforementioned patent applications are hereby incorporated by reference in their entireties.

TECHNICAL FIELD

This application relates to the field of communications technologies, and in particular, to a method and an apparatus for processing a transmission path fault, and a system.

BACKGROUND

Segment routing-traffic engineering (SR-TE) is a new multiprotocol label switching (MPLS) TE tunneling technology that uses the interior gateway protocol (IGP) or the border gateway protocol (BGP) as control signaling. A controller is responsible for calculating a forwarding path for the tunnel and delivering a label stack strictly mapped to the path to a transponder. On an ingress node of an SR-TE tunnel, the transponder can control a transmission path of a packet based on the label stack.

When a node on a primary path is faulty, currently, a backup path is used to forward a packet based on a fast reroute (FRR) technology.

For example, when a node A on the primary path is faulty, after a previous-hop node B of the node A on the primary path perceives that the node A is faulty, the previous-hop node B switches a data packet to the backup path for transmission based on a label information table (also referred to as a context table) generated for the node A in advance and primary and secondary forwarding tables generated for the node A in advance. The context table includes node (prefix) label information corresponding to all nodes in an entire network and an adjacency label that is advertised by the node A.

Because the context table is generated in advance, in an SR-TE FRR solution, the node B generates a context table for each neighbor of the node A. Therefore, a specification of the context table is a quantity of nodes in the entire network plus a quantity of neighbors of a neighboring node, and each node needs to generate the following quantity of context tables: a quantity of neighbors*(the quantity of nodes in the entire network plus the quantity of neighbors of the neighboring node).

When the network includes a relatively large quantity of nodes, and a capacity of a context table supported by some nodes cannot reach the quantity of neighbors*(the quantity of nodes in the entire network plus the quantity of neighbors of the neighboring node), content in the context table generated by the nodes is incomplete or fails to be generated. When a node in the network is faulty, because a correct backup path cannot be switched to based on the context table, a data packet may fail to be forwarded.

SUMMARY

This application provides a method and an apparatus for processing a transmission path fault, and a system, to resolve a prior-art problem that a data packet fails to be forwarded because a capacity of a context table supported by a node is insufficient.

According to a first aspect, an embodiment of this application provides a method for processing a transmission path fault, including: receiving, by a first network device, a first packet sent by a second network device, where the second network device is a previous-hop network device of the first network device on a primary path; determining, by the first network device when determining that the third network device is faulty, a difference between an initial value of a segment routing global block SRGB of the first network device and an initial value of an SRGB of the third network device, where the third network device is a next-hop network device of the first network device on the primary path; obtaining, by the first network device, a first label from the first packet, where the first label is determined based on the initial value of the SRGB of the third network device and a node segment identifier of a fourth network device, and the fourth network device is a next-hop network device of the third network device on the primary path; using, by the first network device, a sum value of the first label and the difference as an incoming label of a backup path from the first network device to the fourth network device, and determining, from a backup forwarding table, an outgoing label of the backup path from the first network device to the fourth network device; and sending, by the first network device, the first packet to a next-hop network device of the first network device on the backup path based on the outgoing label.

By using the foregoing solution, the backup path is determined by using an SRGB difference and the backup forwarding table, so that a problem that a data packet fails to be forwarded because a capacity of a context table supported by a node is insufficient can be overcome.

In a possible design, the first packet includes a label stack list used to provide guidance on forwarding of the first packet on the primary path; and the determining a difference between an initial value of an SRGB of the first network device and an initial value of an SRGB of a third network device includes: obtaining, by the first network device, a second label from a top of the label stack list, where the second label is determined based on a node segment identifier of the third network device and the initial value of the SRGB of the first network device; determining, by the first network device in the backup forwarding table, a first forwarding behavior corresponding to the second label, where the first forwarding behavior is used to indicate to search a label information table, and the label information table includes the difference corresponding to the second label; and obtaining, by the first network device, the difference from the label information table.

By using the foregoing design, SRGB initial values of two neighboring nodes are stored in the label information table in advance, so that when the difference between the initial value of the SRGB of the first network device and the initial value of the SRGB of the third network device is determined, the difference is directly obtained from the label information table providing storage, thereby saving processing resources. In addition, the label information table includes only the difference and information related to a node segment identifier of a network device adjacent to the third network device, and node segment identifiers of all nodes in an entire network do not need to be stored in a context table, thereby saving storage resources, and overcoming a problem that a data packet fails to be forwarded because a capacity of the context table supported by a node is insufficient.

In a possible design, the obtaining, by the first network device, a first label from the first packet includes: obtaining, by the first network device after popping the second label from the top of the label stack list, the first label from the top of the label stack list from which the second label is popped; and the sending, by the first network device, the first packet to a next-hop network device of the first network device on the backup path based on the outgoing label includes: switching, by the first network device, the first label in the label stack list for the outgoing label, and sending an updated first packet to the next-hop network device of the first network device on the backup path.

In a possible design, after receiving the node segment identifier of the third network device flooded in a network by the third network device, the first network device floods another network device in the network with the node segment identifier of the third network device, where the first label is determined by the second network device based on the node segment identifier that is of the third network device and that is flooded by the first network device and the initial value of the SRBG of the first network device.

When there is a loose path in a forwarding path, and a destination node on a loose path segment is faulty, after fault information of the node is flooded to an entire network, all nodes in the entire network delete corresponding primary and secondary forwarding tables to the fault node. When the destination node on the loose path segment is faulty, in both the primary path and the backup path, from a first node to a last node, all nodes need to pass through the loose path segment, and the last node can be reached by bypassing the fault node from a previous-hop node of the faulty node. After primary and secondary forwarding tables to the faulty node are deleted, a source node on the path segment cannot forward the data packet to the previous-hop node of the fault node. As a result, a packet forwarding failure is caused. Therefore, by using the foregoing design, after receiving a node segment identifier of the destination node on the loose path segment, a previous-hop node of the destination node on the loose path segment floods the entire network with the node segment identifier of the destination node. In this way, the source node on the loose path segment can determine the forwarding path based on the node segment identifier of the destination node, and forward the data packet.

In a possible design, when determining that the third network device is faulty, the first network device may flood the entire network with the node segment identifier of the third network device.

In a possible design, the method further includes: receiving, by the first network device, indication information sent by the third network device after the fault is recovered, where the indication information is used to indicate that the third network device cannot correctly forward a packet; and sending, by the first network device when receiving a second packet sent by the second network device, the second packet based on the determined outgoing label.

When a forwarding node on the primary path is faulty, a previous-hop node switches to the backup path to forward a packet. After the fault node is recovered and restarted, the node after the fault is recovered re-floods another node in the network with information such as a node (prefix) label and an adjacency label that are of the node. After receiving the information flooded by the node after the fault is recovered, the previous-hop node switches the data packet back to the primary path, that is, the packet is transmitted by reusing the node after the fault is recovered. However, because the node after the fault is recovered is just restarted, a local database may be incomplete. For example, the local database does not include information about another node, such as information about a node label and an adjacency label of a next-hop node of the node after the fault is recovered on the primary path. In this case, after an RT 3 receives a packet, the packet cannot be forwarded to the next-hop node. As a result, data packet loss is caused. Based on this, by using the foregoing design, after being recovered, the fault node preferentially sends indication information to indicate a previous-hop network device of the fault node that the fault node after being recovered cannot correctly forward a packet. Therefore, the previous-hop network device still forwards a data packet by using the backup path.

According to a second aspect, an embodiment of this application provides a method for processing a transmission path fault, including: determining, by the second network device in a process of sending a packet by using a primary path, that the third network device is faulty; and receiving, by the second network device, a node segment identifier of the third network device flooded in a network by a first network device, where the third network device is a neighboring network device of the first network device, the first network device is a next-hop network device of the second network device on the primary path, and the third network device is a next-hop network device of the first network device on the primary path; and sending, by the second network device, the packet to the first network device by using a backup path based on the node segment identifier of the third network device flooded by the first network device, where the first network device is a next-hop network device of the second network device on the backup path.

When there is a loose path in a forwarding path, and a destination node on a loose path segment is faulty, after fault information of the node is flooded to an entire network, all nodes in the entire network delete corresponding primary and secondary forwarding tables to the fault node. When the destination node on the loose path segment is faulty, in both the primary path and the backup path, from a first node to a last node, all nodes need to pass through the loose path segment, and the last node can be reached by bypassing the fault node from a previous-hop node of the faulty node. After primary and secondary forwarding tables to the faulty node are deleted, a source node on the path segment cannot forward a data packet to the previous-hop node of the fault node. As a result, a packet forwarding failure is caused. Therefore, by using the foregoing design, after receiving a node segment identifier of the destination node on the loose path segment, a previous-hop node of the destination node on the loose path segment floods the entire network with the node segment identifier of the destination node. In this way, the source node on the loose path segment can determine the forwarding path based on the node segment identifier of the destination node, and forward the data packet.

According to a third aspect, based on a same inventive concept as the method embodiment of the first aspect, an embodiment of this application provides an apparatus for processing a transmission path fault. The apparatus is applied to the first network device according to the first aspect. In other words, the apparatus may be the first network device, or may be a chip that can be applied to the first network device. The apparatus has functions of implementing embodiments of the first aspect. The functions may be implemented by using hardware, or may be implemented by hardware by executing corresponding software. The hardware or the software includes one or more modules corresponding to the foregoing functions.

According to a fourth aspect, based on a same inventive concept as the method embodiment of the second aspect, an embodiment of this application provides an apparatus for processing a transmission path fault. The apparatus is applied to the network device according to the second aspect. In other words, the apparatus may be the network device, or may be a chip that can be applied to the network device. The apparatus has functions of implementing embodiments of the second aspect. The functions may be implemented by hardware, or may be implemented by hardware by executing corresponding software. The hardware or the software includes one or more modules corresponding to the foregoing functions.

According to a fifth aspect, an embodiment of this application provides an apparatus for processing a transmission path fault, and the apparatus includes a processor and a memory, where the memory is configured to store an instruction. When the apparatus runs, the processor executes the instruction stored in the memory, so that the apparatus performs the method for processing a transmission path fault according to any one of the first aspect or the implementations of the first aspect. It should be noted that the memory may be integrated into the processor, or may be independent of the processor. The apparatus may further include a bus. The processor is coupled to the memory by using the bus. The memory may include a read-only memory and a random access memory. When needing to be run, the apparatus is started by using a basic input/output system solidified in the read-only memory or a bootloader booting system in an embedded system, to lead the apparatus to enter a normal running state. After entering the normal running state, the apparatus runs an application program and an operating system in the random access memory, so that the processor performs the method according to any one of the first aspect or the possible implementation designs of the first aspect.

According to a sixth aspect, an embodiment of this application provides an apparatus for processing a transmission path fault, and the apparatus includes a processor and a memory, where the memory is configured to store an instruction. When the apparatus runs, the processor executes the instruction stored in the memory, so that the apparatus performs the method for processing a transmission path fault according to any one of the second aspect or the implementations of the second aspect. It should be noted that the memory may be integrated into the processor, or may be independent of the processor. The apparatus may further include a bus. The processor is coupled to the memory by using the bus. The memory may include a read-only memory and a random access memory. When needing to be run, the apparatus is started by using a basic input/output system solidified in the read-only memory or a bootloader booting system in an embedded system, to lead the apparatus to enter a normal running state. After entering the normal running state, the apparatus runs an application program and an operating system in the random access memory, so that the processor performs the method according to any one of the second aspect or the possible implementation designs of the second aspect.

According to a seventh aspect, an embodiment of this application further provides a system, including the apparatus of the third aspect or the fifth aspect, and the apparatus of the fourth aspect or the sixth aspect. In a possible design, the system may further include another network device that is in the solution provided in this embodiment of this application and that interacts with the two network devices.

For example, the another network device may be another network device on a transmission path.

According to an eighth aspect, an embodiment of this application further provides a readable storage medium. The readable storage medium stores a program or an instruction. When the program runs or the instruction is run on a computer, any method for processing a transmission path fault in the foregoing aspects is performed.

According to a ninth aspect, an embodiment of this application further provides a computer program product including an instruction. When the computer program product runs on a computer, the computer is enabled to perform any method for processing a transmission path fault in the foregoing aspects.

In addition, for technical effects brought by any design manner in the third to the ninth aspects, refer to technical effects brought by different implementations in the first aspect to the second aspect. Details are not described herein.

DETAILED DESCRIPTION OF ILLUSTRATIVE EMBODIMENTS

Figure 1A:
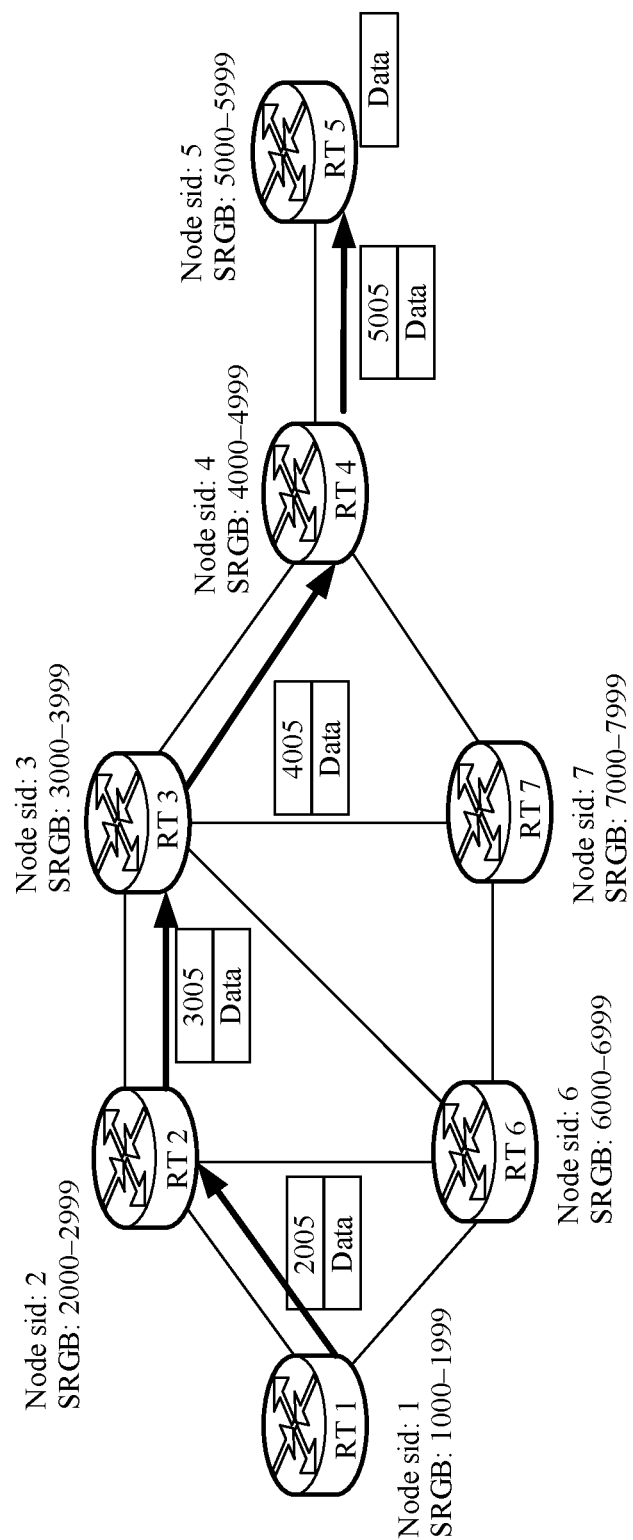
FIG. 1A is a schematic diagram of an architecture of a network system according to an embodiment of this application.

This application is applied to a node that supports SR-TE. In embodiments of this application, a node may also be referred to as a network device. The network device is a device that provides routing and forwarding functions in a network, for example, may be a router, a switch, a transponder, or a label switching router (LSR). This is not limited. In a subsequent description process, the node is used as an example for description.

In an SR-TE technology, a control plane distributes an MPLS label of the node by using the IGP protocol that is based on a link state or the border gateway protocol (BGP), and a data plane forwards an MPLS packet based on the label distributed by the control plane.

SR-TE is a new TE tunneling technology that uses an interior gateway protocol (IGP) or a border gateway protocol (BGP) protocol as control signaling. A controller is responsible for calculating a forwarding path of a tunnel and delivering a label stack list strictly corresponding to the path to a transponder. On an ingress node of the SR-TE tunnel, the transponder can control a transmission path of a packet in the network based on the label stack list.

The terms in the embodiments of this application are first explained below.

(1) Segment routing global block (SRGB): a set of labels that are specified by a user to be reserved for a segment (segment).

(2) Segment (segment): a segment is identified by using a segment label (Segment ID, SID). The segment label in the embodiments of this application may be referred to as a segment identifier. On a forwarding plane, the SID can be mapped to the MPLS label.

Segments are classified into three types of segments, namely, prefix segments, adjacency segments, and node segments.

A prefix segment is used to identify a prefix (Prefix) of a destination address in an SR network. The prefix segment may be flooded to another network element by using the IGP protocol, where the prefix segment is globally visible and globally effective. The prefix segment is identified by a prefix segment identifier (Prefix SID). In the embodiments of this application, a prefix segment label is referred to as a prefix label for short. The prefix SID is an offset within a range of an SRGB advertised by a destination node. A receive end calculates an actual label based on an SRGB of the receive end.

The adjacency segment is used to identify a routing link between two adjacent nodes in the network. The adjacency segments may be flooded to another network element by using the IGP protocol, where the adjacency segment is globally visible and locally effective. The adjacency segment is identified by an adjacency segment label (Adjacency Segment ID, Adjacency SID). In the embodiments of this application, the adjacency segment label is referred to as an adjacency label for short.

The adjacency label is directional and is used to provide guidance on packet forwarding. For example, an adjacency label 9003 corresponds to a link PE1→P3. The adjacency SID is a local SID outside the SRGB range.

The node segment is a special prefix segment used to identify a specific node. An IP address is configured as a prefix for a local loopback interface of the node. A prefix SID of the node is a node segment label (Node SID). In the embodiments of this application, the node segment label is referred to as a node label for short.

In brief, the prefix segment represents a destination address, and the adjacency segment represents an outgoing link of a data packet, and the destination address and the outgoing link may be respectively similar to a destination IP address and an outbound interface in conventional IP forwarding. In an IGP area, a node uses an extended IGP protocol to flood a node SID and an adjacency SID that are of the node, so that any node can obtain information about another node.

Any path in the network can be constructed by combining a prefix (node) SID and an adjacency SID. A path in the network may be formed by a plurality of routing segments. The constructed path is represented by a label stack list. The label stack list includes a segment label (Segment ID) corresponding to each routing segment on a forwarding path.

The destination node forwards node analysis node by using the node (prefix) SID of the IGP protocol and calculates the label value based on its own SRGB. Then, each node uses topology information collected by the IGP protocol to calculate a label forwarding path based on the shortest path algorithm, and delivers the calculated next hop and outgoing label (OuterLabel) information to the forwarding table to provide guidance on data packet forwarding.

In addition, it should be noted that "a plurality of" in the embodiments of this application means two or more. The term "and/or" describes an association relationship for describing associated objects and represents that three relationships may exist. For example, A and/or B may represent the following three cases: only A exists, both A and B exist, and only B exists. In addition, it should be understood that, in the description of this application, terms such as "first" and "second" are merely used for a purpose of distinguishing between descriptions, but cannot be understood as indication or implication of relative importance, and cannot be understood as an indication or implication of a sequence. A node 1 or a node 2 is also merely used to distinguish between described nodes, and cannot be understood as an indication or implication of relative importance, and cannot be understood as an indication or implication of a sequence.

In addition, the forwarding table in the embodiments of this application may generally include only a primary forwarding table, or may include a primary forwarding table and a backup forwarding table. The primary/backup forwarding tables in the embodiments of this application generally include a primary forwarding table and a backup forwarding table.

FIG. 1A is used as an example to describe creation of a segment path of a prefix segment and forwarding of a data packet.

For example, prefix segment paths to be established are RT 1, RT 2, RT 3, RT 4, and RT 5. The RT 1 is a first node of the prefix segment, and the RT 5 is a destination node of the prefix segment.

SRGB=[5000-5999] is configured on the RT 5 and a prefix (node) SID that is 5 is configured for a loopback interface of the RT 5. The RT 5 generates and delivers a forwarding table based on the SRGB and prefix (node) SID. The SRGB and the prefix SID of the RT 5 are encapsulated into a control packet and the control packet is flooded to the entire network by using IGP. After receiving the control packet, another network device in the network parses the prefix SID advertised by the RT 5 and calculates an incoming label value based on an SRGB of the another network device. In addition, the another network device calculates an outgoing label (OuterLabel) value based on an SRGB advertised by a next-hop node, calculates a label forwarding path by using an IGP topology, and then generates a forwarding table.

The RT 4 parses the prefix SID advertised by the RT 5 and calculates a label value based on SRGB=[4000-4999] of the RT 4. A calculation formula is as follows: inLabel=a start value of the SRGB+a prefix SID value. Therefore, inLabel=4000+5=4005. An outgoing label (OuterLabel) is calculated by using an IS-IS topology. A calculation formula is as follows: OuterLabel=a start value of an SRGB advertised by a next-hop device+the prefix SID value (namely, a node label of a destination node on the prefix segment or the node segment). As shown in FIG. 1A, the next-hop device of the RT 4 is the RT 5, and arrange of the SRGB advertised by the RT 5 is from 5000 to 5999. Therefore, OuterLabel=5000+5=5005.

A calculation process of the RT 3 is similar to that of the RT 4, that is, inLabel=3000+5=3005, and OuterLabel=4000+5=4005. A calculation process of the RT 2 is similar to that of the RT 4, that is, inLabel=2000+5=2005, and OuterLabel=3000+5=3005. A calculation process of the RT 1 is similar to that of the RT 4, that is, inLabel=1000+ 5=1005, and OuterLabel=2000+5=2005.

After the segment paths from the RT 1 to the RT 5 are established, the RT 1 receives a data packet, adds a label value 2005 to the data packet, and forwards the data packet. The RT 2 node receives the data packet carrying the label, performs label switching, pops the label 2005, and replaces the label with an outgoing label 3005. The RT 3 node receives the data packet, performs label switching, pops the label 3005, and replaces the label with an outgoing label 4005. After receiving the data packet, the RT 4 pops the label 4005 and replaces the label 4005 with a label 5005. After receiving the data packet, the RT 5 pops the label 5005 and continues to search for a route to forward the packet.

Figure 1B:
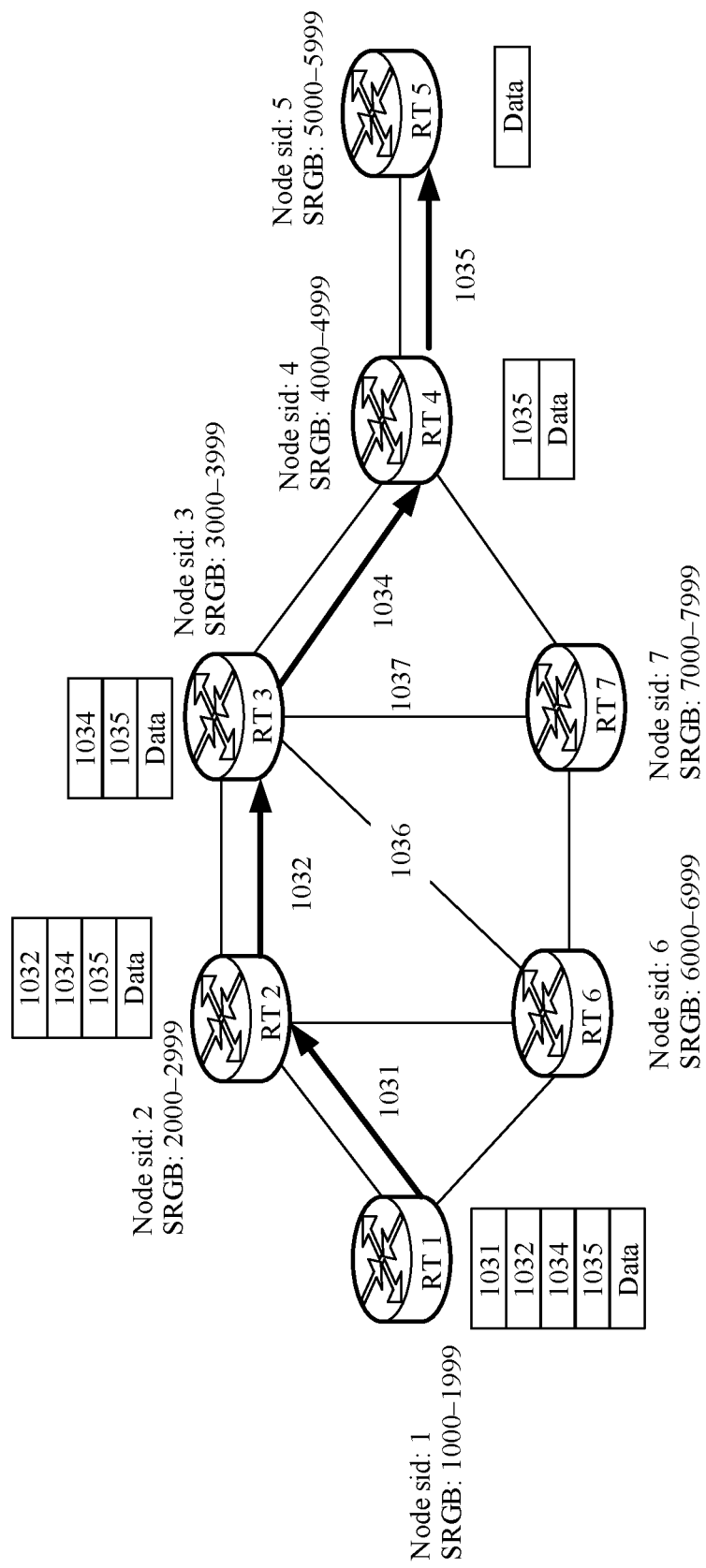
FIG. 1B is a schematic diagram of an architecture of another network system according to an embodiment of this application.

The following uses FIG. 1B as an example to describe creation of a strict segment path (which is not allowed to be a loose path) and forwarding of a data packet.

The transponder allocates an adjacency label based on the IGP protocol and reports the allocated adjacency label to the controller, so that the controller generates the label stack list based on the adjacency label.

The adjacency label is flooded to the entire network by using the IGP protocol. As shown in FIG. 1B, by using the RT 1 node as an example, a process of allocating the adjacency label by the IGP protocol is as follows.

The RT 1 applies a local dynamic label for all links of the RT 1 by using the IGP protocol (for example, the RT 1 assigns an adjacency label 1031 to a link RT 1→RT 2). The RT 1 advertises an adjacency label by using the IGP protocol, and floods the entire network with the adjacency label. Another device in the network learns, by using the IGP protocol, the adjacency label advertised by the RT 1. Specifically, another node assigns and advertises an adjacency label as the RT 1 does, and floods another device in the network with the adjacency label.

The controller calculates a path based on constraint attributes of the SR-TE tunnel. After calculating the path, the controller combines adjacency labels of the entire path based on a topology and the adjacency labels to generate a label stack list. For example, referring to FIG. 1B, the controller calculates an SR-TE tunnel path as RT 1→RT 2→RT 3→RT 4→RT 5, a corresponding label stack list is {1031, 1032, 1034, 1035}, and the controller delivers the label stack list obtained through calculating to the ingress node RT 1 of the transponder. Therefore, the transponder obtains the SR-TE tunnel based on the label stack list delivered by the controller. In this application, a node label may also be used herein to form a label stack list, that is, the label stack list is {1002, 2003, 3004, 4005}.

The transponder performs a label operation on the packet based on the label stack list corresponding to the SR-TE tunnel, searches for a forwarding outbound interface hop by hop based on a top label of the stack, and guides the data packet to be forwarded to the destination address of the tunnel.

When the packet enters the SR-TE tunnel, the ingress node adds a label stack list to the packet. When the packet is forwarded through the SR-TE tunnel, after the forwarding outbound interface is searched for based on the topmost label, the ingress node pops the topmost label. For example, as shown in FIG. 1B, an ingress node PE 1 adds a label stack list {1031, 1032, 1034, 1035} to the data packet, then based on a link matching a label 1031 at the top of the stack, finds that a corresponding forwarding outbound interface is an RT 1→RT 2 link, and then pops the label 1031. The packet carries the label stack {1032, 1034, 1035}, and is forwarded to the next-hop node RT 2 through the link RT 1→RT 2.

After the intermediate node RT 2 receives the packet, based on the link matching the label 1032 at the top of the stack, the corresponding forwarding interface is found to be an RT 2→RT 3 link, and then the label 1032 is popped, and so on. After the node RT 3 receives the packet, the node RT 3 continues forwarding in the same manner as the intermediate node RT 3. After the node RT 4 pops the last label 1035, the data packet is forwarded to the node RT 5. The packet received by the outgoing node RT 5 has no label and continues to be forwarded by looking up the routing table.

In a strict segment path mode, even if there is an equal-cost path, load balancing cannot be performed. In this case, a node label of a loose path may be specified based on a node label or a hybrid label stack formed by a node label and an adjacency label. The controller sends the label stack to the first node of the transponder, and the transponder searches for an outbound interface hop by hop based on the label stack to pop the label, and forwards the data packet to the destination address of the tunnel. For example, as shown in FIG. 1B, on a path from the RT 1 to the RT 5, nodes specified to be crossed are the RT 3 and the RT 4. In this case, a loose path is formed between the RT 1 and the RT 3, and may be forwarded by the RT 2 or the RT 6. In this case, a label stack list used for packet forwarding on the RT 1 is {2003, 3004, 4005}.

A link or node fault may occur when a packet is forwarded by using the SR-TE. Currently, an FRR mechanism can be used to restore a path. For example, a node RT2 is a faulty node.

When the node RT2 is not faulty, a forwarding path identified by the label stack of the SR-TE is RT 1→RT 2→RT 3→RT 4→RT 5. When the node RT 2 is faulty, the neighboring node RT 1 of the node RT 2 replaces the node RT 2 to perform a label popping (POP) action, uses a next layer label as a destination address, and uses a path bypassing the faulty node RT 2 as a backup path to forward the data packet. The backup path is RT 1→RT 6→RT 3→RT 4→RT 5.

For example, the label stack list used by the RT 1 to send the data packet is {1002, 2003, 3004, 4005}. The RT 1 may determine that the RT 2 is a faulty node by checking a top label 1002 of the label stack, and then determine that a node that the path after the faulty node needs to reach is the RT 3 by checking the top label 1002 and a second label 2003 of the label stack. The RT 1 calculates a path bypassing the faulty node RT 2 to reach the node (the RT 3) identified by the second label 2003, and uses the path as a node protection path for SR-TE FRR of the next-hop node RT 2.

In a scenario in which a faulty node is switched to an SR-TE FRR path, there are the following three problems.

Problem 1: A capacity of a label information table is limited. For example, the capacity may refer to a storage capacity.

Problem 2: A packet fails to be forwarded because of a loose path.

Problem 3: A packet fails to be forwarded because of incomplete creation of a forwarding table.

The following describes the three problems and the corresponding solutions in detail.

For problem 1:

Before the RT 2 node is faulty, each node calculates a backup forwarding table and a label information table (context table) by using the IGP in advance. Each node generates a context table for a neighboring node of the node, where a quantity of neighboring nodes of each node is equal to a quantity of context tables generated on each node. The context table includes node (prefix) labels of all nodes in the entire network and all adjacency labels advertised by neighboring nodes.

For example, the node RT 1 generates a context table for its neighboring node RT 2, where the context table includes node (prefix) label information corresponding to all nodes in the entire network and an adjacency label advertised by the RT 2. Node (prefix) label information corresponding to each node of all nodes in the entire network is a sum of a node label of the node and an initial value of an SRGB of the RT 2 node.

Because the context table is generated in advance, in an SR-TE FRR solution, the node generates a context table for each neighbor of the node. Therefore, a specification of the context table is a quantity of nodes in the entire network plus a quantity of neighbors of a neighboring node, and each node needs to generate the following quantity of context tables: a quantity of neighbors*(the quantity of nodes in the entire network plus the quantity of neighbors of the neighboring node).

When the network includes a relatively large quantity of nodes, and a specification of a context table supported by some nodes is insufficient to support a specification such as the quantity of nodes in the entire network plus the quantity of neighbors of the neighboring node, content in the context table generated by the nodes is incomplete. When a node in the network is faulty, because a correct backup path cannot be switched to, a packet may fail to be forwarded.

It should be noted that when a node on the primary path is faulty or a path from a node to a next hop is faulty, after a previous-hop node of the node on the primary path perceives the fault, the previous-hop node floods another node in the network with fault information of the node.

Figure 2:
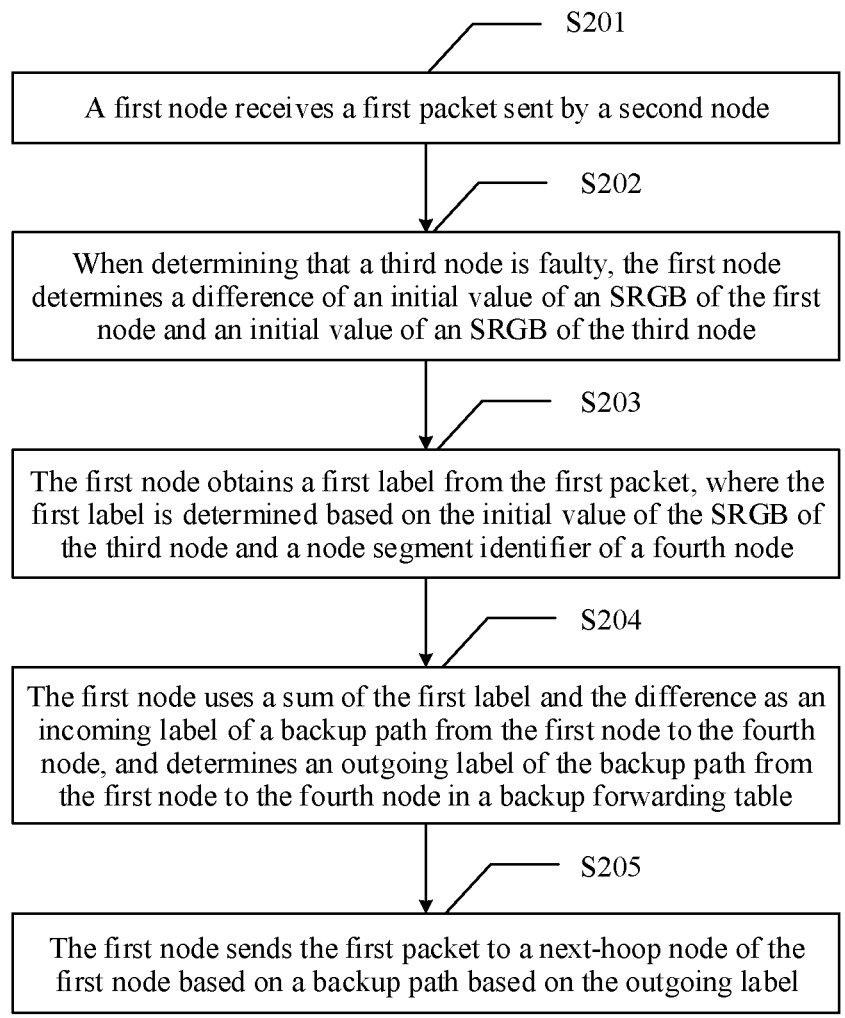
FIG. 2 is a flowchart of a method for processing a transmission path fault according to an embodiment of this application.

Based on this, an embodiment of this application provides a method for processing a transmission path fault. Reference is made to FIG. 2.

S201. A first node receives a first packet sent by a second node.

The second node is a previous-hop node of the first node on the primary path.

S202. When determining that the third node is faulty, the first node determines a difference between an initial value of a segment routing global block SRGB of the first node and an initial value of an SRGB of the third node.

The third node is a next-hop node of the first node on the primary path.

S203. The first node obtains a first label from the first packet, where the first label is determined based on the initial value of the SRGB of the third node and a node segment identifier of a fourth node.

The fourth node is a next-hop node of the third node on the primary path.

S204. The first node uses a sum of the first label and the difference as an incoming label of a backup path from the first node to the fourth node, and determines an outgoing label of the backup path from the first node to the fourth node from a backup forwarding table.

S205. The first node sends the first packet to the next-hop node of the first node on the backup path based on the outgoing label.

By using the foregoing solution, the backup path is determined by using an SRGB difference and the backup forwarding table, so that a problem that a data packet fails to be forwarded because a capacity of a context table supported by a node is insufficient can be overcome.

In a possible implementation, the first packet includes a label stack list used to provide guidance on forwarding of the first packet on the primary path; and the determining a difference between an initial value of an SRGB of the first node and an initial value of an SRGB of the third node includes: obtaining, by the first node, a second label from the top of the label stack list, where the second label is determined based on a node segment identifier of the third node and the initial value of the SRGB of the first node; determining, by the first node in the backup forwarding table, a first forwarding behavior corresponding to the second label, where the first forwarding behavior is used to indicate to search a label information table, and the label information table includes the difference corresponding to the second label; and obtaining, by the first node, the difference from the label information table.

In the prior art, when a node on the primary path is faulty, and when a previous-hop node of the faulty node switches from the primary path to the backup path by generating a context table for the faulty node, searches the backup forwarding table according to the top label in the label stack, after it is determined that the forwarding behavior in the forwarding entry corresponding to the top label in the backup forwarding table is to search the context table, a next-hop node that needs to forward a packet on the backup path is determined according to the context table, that is, the backup forwarding table is queried only once in the prior art, and it is determined that the backup path is implemented by the context table, however, in the solution provided in this embodiment of this application, when the difference between the SRGBs is delivered to the forwarding plane node, only the context table needs to be used to determine the node label of the next-hop node of the faulty node, and the next-hop node for forwarding the packet on the backup path is determined, the backup forwarding table is queried again according to the node label of the next-hop node of the faulty node. Therefore, the context table does not need to include node labels corresponding to all nodes, and only needs to include label information corresponding to a node adjacent to the neighboring node, thereby avoiding a packet forwarding failure caused by insufficient entry capacity, in addition, storage resources can be saved.

In a possible implementation, after receiving the node segment identifier of the third node flooded in the network by the third node, the first node floods another node in the network with the node segment identifier of the third node, where the first label is determined by the second node based on the node segment identifier of the third node that is flooded by the first node and the initial value of the SRGB of the first node.

Based on this, the second node receives the node segment identifier of the third node flooded in the network by the first node; the third node is an adjacent node of the first node, and a priority of the node segment identifier of the third node flooded by the first node is lower than a priority of the node segment identifier of the third node flooded by the third node; in a process of sending a packet by using the primary path, the second node determines that the third node is faulty; the first node is a next-hop node of the second node on the primary path, and the third node is a next-hop node of the first node on the primary path; the second node sends the packet to the first node through the backup path based on the node segment identifier of the third node that is flooded by the first node; and the first node is a next-hop node of the second node on the backup path.

In this manner, problem 2 can be resolved. For specific implementation, refer to the following detailed descriptions of problem 2.

In a possible implementation, the first network device receives indication information sent by the third network device after the fault is recovered, where the indication information is used to indicate that the third network device cannot correctly forward a packet; and when receiving a second packet sent by the second network device, the first network device sends the second packet based on the determined outgoing label. In this manner, problem 3 can be resolved. For specific implementation, refer to the following detailed descriptions of problem 3.

The following describes in more detail the method for processing a transmission path fault provided in this embodiment of this application with reference to a specific scenario. It should be noted that the following method procedure is relatively comprehensive. Some steps or descriptions are possible implementations. Any two or more steps in the method procedure may constitute a solution that needs to be protected in this embodiment of this application, to be specific, when some steps are optional, remaining steps may still constitute the solution that needs to be protected in this embodiment of this application, and the optional steps may further have another possible implementation.

This embodiment of this application provides a manner of configuring a context table. When a node obtains, by using an IGP, an adjacency label advertised by a neighboring node and a node label of a node adjacent to the neighboring node, and after learning an SRGB of the neighboring node, the node generates a context table. The context table includes an adjacency label advertised by the neighboring node, node label information of a node adjacent to the neighboring node, and a difference between an initial value of an SRGB of the node and an initial value of an SRGB of the neighboring node, where the node label information herein is a sum of the initial value of the SRGB of the neighboring node and a node label of a node adjacent to the neighboring node.

Figure 3:
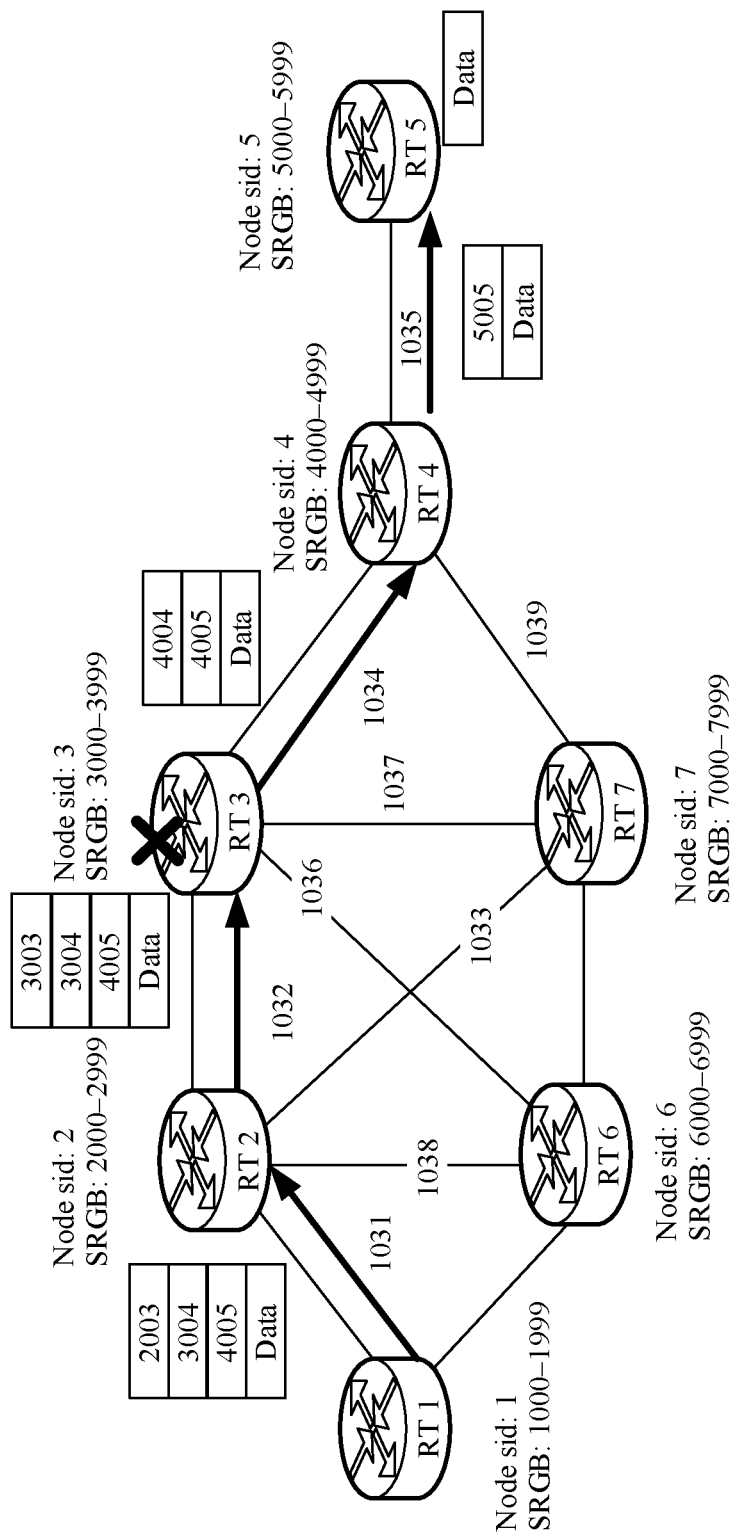
FIG. 3 is a schematic diagram of an architecture of still another network system according to an embodiment of this application.

Using FIG. 3 as an example, some content of the context table generated by the RT 2 is shown in Table 1, and Table 1 shows some content of an entry generated for the neighboring node RT 3 in the context table. The initial value of the SRGB of the RT 2 is 2000, and the initial value of the SRGB of the neighboring node RT 3 of the RT 2 is 3000. Therefore, a difference between the initial value of the SRGB of the RT 2 and the initial value of the SRGB of the RT 3 is −1000.

TABLE 1

| Inlabel | SRGB difference | adj Sid | Sid of the adj node |
|---------|-----------------|---------|---------------------|
| 2003    | −1000           | 1034    | 2004                |
|         |                 | 1037    | 2007                |
|         |                 | 1036    | 2006                |

In label indicates an incoming label, which is the initial value of the SRGB of the node plus a node Sid of the neighboring node, that is, the initial value 2000 of the SRGB of the RT 2+a node label 3 of the RT 3=2003. The incoming label is used as the key field for querying the context table.

SRGB difference is the initial value of the SRGB of the node minus the initial value of the SRGB of the neighboring node.

Adj Sid indicates the adjacency label advertised by the neighboring node. The adjacency label advertised by the RT 3 is an adjacency label 1034 of a link between the RT 3 and the RT 4, an adjacency label 1037 of a link between the RT 3 and the RT 7, and an adjacency label 1036 of a link between the RT 3 and the RT 6.

Adj node Sid indicates a destination node corresponding to the adjacency label advertised by the neighboring node, which uses the initial value of the SRGB of the node plus the node Sid advertised by the destination node. For example, if a destination node of the adjacency label 1034 of the link between the RT 3 and the RT 4 is the RT 4, the Adj node Sid corresponding to 1034 is the initial value of the SRGB of RT 2+the node label of the RT 4=2004RT 4.

The following uses FIG. 3 as an example to describe in detail a data packet forwarding process.

As shown in FIG. 3, for a path from the RT 1 to the RT 5, nodes specified to be crossed are the RT 3 and the RT 4. In this case, a loose path is formed between the RT 1 and the RT 3, and may be forwarded by the RT 2 or the RT 6. In this embodiment of this application, the RT 1 performs path computation and determines that the primary path is RT 1→RT 2→RT 3→RT 4→RT 5. In this case, a label stack list used for packet forwarding on the RT 1 is {2003, 3004, 4005}. For example, if the RT 3 is faulty, the backup path is RT 1→RT 2→RT 7→RT 4→RT 5. In addition, the RT 2 may generate the primary/backup forwarding tables of node Sids in the entire network. For some content of the primary/backup forwarding tables, refer to Table 2. FIG. 2 shows only partial content of two entries whose incoming labels are 2003 and 2004.

TABLE 2

| Inlabel | Action (action) | Outerlabel | Type (type) |
|---------|-----------------|------------|-------------|
| 2003    | Fwd to (forwarded to) the RT 3 | 3003 | Primary |
|         | Pop: Search the context table |  | Backup |
| 2004    | Fwd to (forwarded to) the RT 3 | 3004 | Primary |
|         | Fwd to (forwarded to) the RT 7 | 7004 | Backup |

When the RT 3 is not faulty, as shown in FIG. 3, the RT 1 sends a data packet to the RT 2, where a label stack in the data packet is {2003, 3004, 4005}. The primary forwarding table is searched based on a top label in the label stack. For example, Table 2 is searched, the top label is 2003, 2003 is used as an in label, and the incoming label is searched for and is the forwarding entry corresponding to the incoming label 2003. A forwarding behavior indicated in the forwarding entry is forwarded to the RT 3, so that the RT 2 switches the top label of the stack to 3003, that is, the top label of the stack is switched to a label value determined based on the initial value of the SRGB of the next-hop node (the initial value of the SRGB of the RT 3) and the label value determined by the node label (the node label of the RT 3) of the destination node, and then the updated data packet is forwarded to the RT 3. After the RT 3 receives the data packet sent by the RT 2, the label stack in the data packet is {3003, 3004, 4005}, and it is determined that the top label of the stack is at least a label advertised by the receiving node. Therefore, after the top label of the stack is popped, based on the top label 3004, it is determined that the next-hop node is the RT 4, the top label 3004 is switched to 4004, and the updated data packet is forwarded to the RT 4. Similarly, after the RT 4 receives the data packet sent by the RT 3, the label stack of the data packet is {3004, 4005}. It is determined that the top label indicates that the receiving node is itself. Therefore, the top label is popped. Based on the top label 4005, it is determined that a next-hop node is the RT 5, and therefore, the top label is switched to 5005, and forwards the updated data packet to the RT 5. After the RT 5 receives the data packet sent by the RT 4, the label stack of the data packet is {5005}. It is determined that the top label indicates that the receiving node is itself. Therefore, the top label is popped, and the forwarding table continues to be searched for forwarding.

Therefore, after receiving the data packet of the RT 1, based on the top label 2003 of the label stack of the data packet, the RT 2 determines that the next-hop node RT 3 indicated by the top label is faulty, the RT 2 needs to find a forwarding path from the RT 3 to the next-hop node RT 4 that bypasses the RT 3. In this way, the backup forwarding table (Table 2) is searched, the found forwarding behavior is popping the top label 2003, and the context table generated by the RT 2 for the neighboring node RT 3 is searched. The SRGB difference obtained based on the context table in Table 1 is −1000, and the top label 2003 is popped. In this case, the label stack is {3004, 4005}. The RT 2 obtains the label from the RT 3 to the next-hop node RT 4, that is, the top label 3004. The difference between the top label of the stack and the SRGB is used as a sum, that is, a second outer label (3004)+the difference between the SRGB (−1000)=2004, that is, the incoming label on the RT 2 in the routing segment from the ingress node RT 2 to the egress node RT 4 is obtained. 2004 is used as the incoming label to search the primary forwarding table. The found next-hop node is the RT 3. Because an interface to the RT 3 is faulty, it is switched to the backup path and the backup forwarding table is searched. The forwarding behavior found by using 2004 as the incoming label is to be forwarded to the RT 7, and the outgoing label is 7004, so that the RT 2 node exchanges the top label of the stack with the found outgoing label, that is, pops the top label 3004 and exchanges it with 7004. The label stack herein is {7004, 4005}. The updated data packet is forwarded to the RT 7.

After receiving the data packet, based on the top label 7004, the RT 7 determines that the next-hop node is the RT 4, to exchange the top label 7004 to 4004, and forward the updated data packet to the RT 4. Similarly, after receiving the data packet, the RT 4 determines that the destination node indicated by the top label of the stack is itself, pops the top label of the stack, and determines that the next-hop node indicated by the top label 4005 of the updated label stack is the RT 5, to switch the top label 4005 to 5005 and send the updated data packet to the RT 5.

In the prior art, when a node on the primary path is faulty, the previous-hop node of the faulty node generates a context table for the faulty node, and when the primary/secondary forwarding table is switched from the primary path to the backup path, searches the backup forwarding table according to the top label in the label stack, after it is determined that a forwarding behavior in a forwarding entry corresponding to the top label in the backup forwarding table is to search a context table, a next-hop node that needs to forward a packet on a backup path is determined according to the context table, that is, the backup forwarding table is queried only once in the prior art, and it is determined that the backup path is implemented by using the context table, however, in the solution provided in this embodiment of this application, when the difference between the SRGBs is delivered to the forwarding plane node, only the context table needs to be used to determine the node label of the next-hop node of the faulty node, and the next-hop node for forwarding the packet on the backup path is determined, the backup forwarding table is queried again by using the node label of the next-hop node of the faulty node. Therefore, the context table does not need to include node labels corresponding to all nodes, and only needs to include label information corresponding to a node adjacent to the neighboring node, thereby avoiding a packet forwarding failure caused by insufficient entry capacity, in addition, storage resources can be saved.

For problem 2:

When there is a loose path in a forwarding path, and a destination node on a loose path segment is faulty, after fault information of the node is flooded to an entire network, all nodes in the entire network delete corresponding primary and secondary forwarding tables to the fault node. When the destination node on the loose path segment is faulty, in both the primary path and the backup path, from a first node to a last node, all nodes need to pass through the loose path segment, and the last node can be reached by bypassing the fault node from a previous-hop node of the faulty node. After primary and secondary forwarding tables to the faulty node are deleted, a source node on the path segment cannot forward a data packet to the previous-hop node of the fault node. As a result, a packet forwarding failure is caused.

Using FIG. 3 as an example, nodes that an SR-TE path specified by the RT 1 passes through are the RT 3, the RT 4, and the RT 5. When the RT 3 is faulty, the RT 2 perceives that the RT 3 is faulty, and floods (Flooding) fault information of the RT 3 by using IGP. At the same time, SR-TE FRR switching is triggered to switch to the backup paths RT 7, RT 4, and RT 5, and the fault point RT 3 is bypassed. When the fault information of the RT 3 is flooded to all nodes in the entire network, the RT 1 starts convergence and deletes the primary and backup forwarding tables to the RT 3. As a result, the RT 1 cannot forward a data packet to the RT 2.

Based on this, an embodiment of this application provides a method for processing a transmission path fault. A previous-hop node of a faulty node floods all nodes in the entire network with a prefix (node) label of the faulty node by using an IGP protocol. In one manner, when the previous-hop node of the faulty node perceives that the faulty node is faulty, the prefix (node) label of the faulty node is flooded to the entire network by using the IGP protocol. For example, a priority of the prefix label of the faulty node flooded by the previous-hop node may be set to be lower than a priority of the prefix label of the faulty node flooded by the faulty node when the faulty node obtains the prefix label of the faulty node before the fault occurs. The other manner is: before the faulty node is faulty, when obtaining the prefix label of the faulty node, the faulty node floods the prefix label of the faulty node, and when receiving the prefix label flooded by the faulty node before the faulty node is faulty, the previous-hop node of the faulty node floods the entire network with the prefix label of the faulty node. For example, a priority of the prefix label of the faulty node flooded by the previous-hop node may be set to be lower than a priority of the prefix label of the faulty node flooded by the faulty node when the faulty node obtains the prefix label of the faulty node before the fault occurs.

When flooding the prefix label of the faulty node, the previous-hop node may carry the prefix label of the faulty node in a Mapping TLV (Type-Length-Value).

It should be noted that, for details about the mapping TLV in this embodiment of this application, refer to a document draft-ietf-isis-segment-routing-extensions released by an Internet Engineering Task Force (IETF). Content of this document and related parts is generally incorporated into this specification by using an introduction as a whole, for brevity, details are not described herein again.

Figure 5:
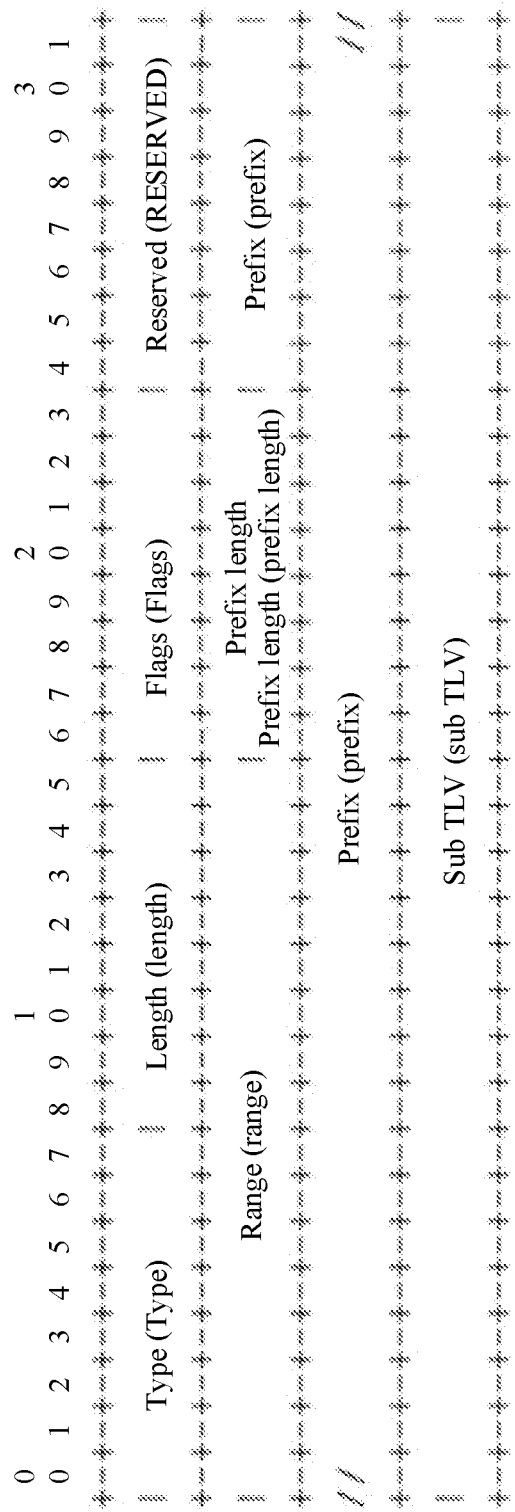
FIG. 5 is a schematic diagram of a TLV format according to an embodiment of this application.

In a TLV definition, there are three fields: a label (Tag) field, a length field, and a content (Value) field. The value contains a label. The Mapping TLV may also be referred to as a label binding TLV (SID/Label Binding TLV). For example, a Mapping TLV format shown in FIG. 5 is used as an example. Type indicates a type of the TLV, Length indicates a length of the control packet, Flags indicates a flag bit, and RESERVED indicates a reserved bit that is not used currently. The Range field provides the ability to specify a Prefix SID segment associated with an address segment, where the Prefix length represents the length of the prefix, the prefix represents the forwarding equivalence class at the last node of the advertised path, and SubTLV represents the sub TLV that issued the Prefix-SID.

For example, in this embodiment of this application, the previous-hop node may add an R field to the Flags, to indicate a re-advertised flag bit, that is, the prefix label for the faulty node is re-advertised by the previous-hop node to another node in the entire network.

Figure 6:
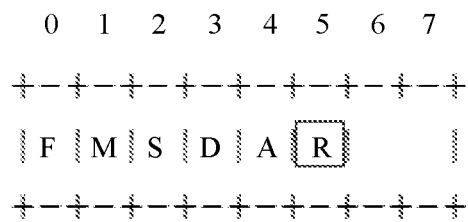
FIG. 6 is a schematic diagram of a flag format according to an embodiment of this application.

For a format of Flags, refer to FIG. 6. F indicates an address family flag. If this bit is not set, it indicates an IPv4 prefix. If this bit is set, it indicates an IPv6 prefix. M indicates a mirroring environment flag. If the advertised SID is associated with a mirroring environment, this flag is set. S indicates whether the SID/Label Binding TLV can be flooded in an entire routing domain. If this bit is set, the SID/Label Binding TLV is flooded in the entire routing domain. If this bit is not set, the SID/Label Binding TLV cannot be leaked between levels. D indicates that the flag needs to be set when the SID/Label Binding TLV is leaked from level-2 to level-1. Otherwise, the flag needs to be cleared. A indicates an auxiliary flag. Level is a concept of network layering in a routing protocol of intermediate system-to-intermediate system (IS-IS). A common area is called a Level-1 area, and a backbone area is called a Level-2 area.

The network architecture shown in FIG. 3 is used as an example. When determining that the RT 3 is faulty, the RT 2 floods the entire network with a node label of the RT 3. A priority of the node label of the RT 3 flooded by the RT 2 may be lower than a priority of the node label of the RT 3 flooded by the RT 3. After receiving the node label of the RT 3 flooded by the RT 2, the RT 1 determines, based on the node label of the RT 3, to send an outgoing label of the data packet to the RT 2, that is, the initial value of the SRGB of the RT 2+the node label of the RT 3=2000+3=2003. After the RT 2 receives the packet, the RT 2 switches to the backup path for forwarding continuously. The RT 2 may switch the backup path to forward the packet in a form of an existing context table, and definitely, may also use the foregoing manner of configuring the context table, which is not limited herein. For a specific sending process, refer to the forwarding manner described in the embodiment for problem 1. Details are not described herein again.

For problem 3:

When a forwarding node on the primary path is faulty, a previous-hop node switches to the backup path to forward a packet. After the fault node is recovered and restarted, the node after the fault is recovered re-floods another node in the network with information such as a node (prefix) label and an adjacency label that are of the node. After receiving the information flooded by the node after the fault is recovered, the previous-hop node switches the data packet back to the primary path, that is, the packet is transmitted by reusing the node after the fault is recovered. However, because the node after the fault is recovered is just restarted, a local database may be incomplete. For example, the local database does not include information about another node, such as information about a node label and an adjacency label of a next-hop node of the node after the fault is recovered on the primary path.

In this case, after an RT 3 receives a packet, the packet cannot be forwarded to the next-hop node. As a result, data packet loss is caused.

As shown in FIG. 3, SR-TE paths specified by the RT 1 are the RT 3, the RT 4, and the RT 5. When the RT 3 is faulty, the RT 2 triggers the SR-TE FRR switching after perceiving that the RT 3 is faulty and switches to the backup paths RT 7, RT 4, and RT 5. Therefore, the faulty node RT 3 is bypassed. After the RT 3 recovers and restarts, the RT 3 re-advertises the Node Sid to the entire network, and the RT 2 switches the data packet back to the RT 3. However, because the RT 3 has just restarted, its local database may not be complete. For example, the RT 3 has not learned node SIDs of the RT 4 and the RT 5. As a result, the data packet cannot be forwarded from the RT 3 to the next hop RT 4 and is discarded.

Based on this, an embodiment of this application provides a method for processing a transmission path fault. When the faulty node recovers and is restarted, to prevent a previous-hop node of the recovered faulty node from learning a prefix SID of another node when the recovered faulty node perceives recovery of the faulty node, the recovered faulty node attempts to learn a prefix SID of another node, and subsequently a data packet is lost. After the faulty node recovers, the indication information is first released in the entire network, where the indication information is used to indicate that the recovered faulty node cannot correctly forward a packet. Therefore, when receiving the data packet to be sent to the recovered faulty node, the previous-hop node still forwards the data packet through the backup path.

For example, the indication information may be carried in an overload bit. The overload bit is defined in an IS-IS routing protocol. If a node cannot complete all connected status data (LSDB), that is, topology information used by local storage to restore all nodes in the entire network, the node uses a bit in a header of a link state data packet advertised by itself to identify the LSDB that is not complete. As a result, the packet cannot be forwarded correctly, and a flag bit of this bit is called Overload (OL) bit. By using the Overload bit in the link state packet advertised by the node, another node knows that the node may fail to make a correct routing decision, that is, cannot forward the data packet correctly, because the LSDB of the node is not complete. The another node does not forward the data packet through this node when calculating a shortest path.

The network architecture shown in FIG. 3 is used as an example. After the faulty node RT 3 recovers and is restarted, to prevent the RT 2 from first perceiving recovery of the RT 3 fault, and at this time, the RT 3 has not learned prefixes Sids of the RT 4 and the RT 5, the data packet is caused to be lost. The RT 3 adds the Overload bit flag to the header of the link state packet after the restart due to a fault.

The RT 2 receives the Overload bit in the link state packet advertised by the RT 3, and senses that the next hop RT 3 is in an Overload state. Therefore, the node RT 2 continues to use the SR-TE FRR forwarding path before the fault recovery, and the RT 2 may forward the data packet by using the backup path in a form of an existing context table, and definitely, may also use the foregoing manner of configuring the context table, which is not limited herein. For a specific sending process, refer to the forwarding manner in the embodiment corresponding to FIG. 4. Details are not described herein again.

Time taken by the faulty node to complete the LSDB, that is, the overload time, is generally long, for example, 60 s. Therefore, within the duration, the RT 2 may forward the data packet based on the SR-TE FRR path (backup path) by looking up the context table. For example, Overload duration may be configured, and the RT 2 forwards the data packet by using the backup path within the duration. When the LSDB is complete, the RT 3 can advertise the link state packet again in the entire network, and the header does not include the overload bit. After receiving the link state data packet that does not include the overload bit flag bit, the RT 2 switches back to the RT 3 to forward the data packet.

Figure 7:
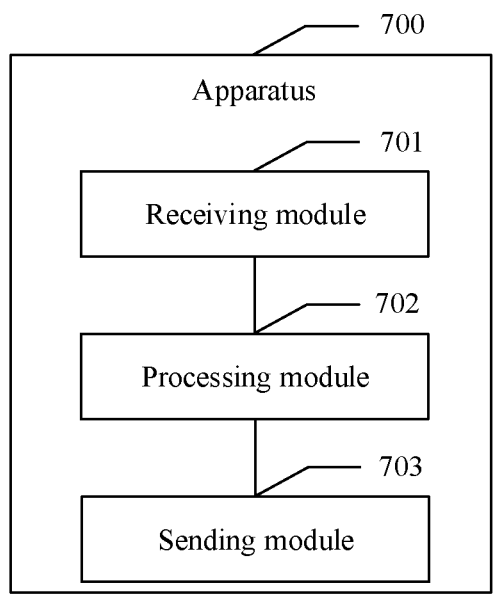
FIG. 7 is a schematic diagram of a structure of an apparatus 700 according to an embodiment of this application.

Based on the same inventive concept as the method embodiment, an embodiment of this application further provides an apparatus, and reference is made to FIG. 7. The apparatus 700 is applied to a network device. The apparatus 700 may include a receiving module 701, a processing module 702, and a sending module 703. The apparatus 700 may specifically be a processor in the network device, a chip, a chip system, a functional module, or the like. The processing module 702 is used to control and manage an action of the apparatus 700, the receiving module 701 is used to receive information or a packet, the sending module 703 is used to send the information or the packet, and the processing module 702 is used to process the information or the packet received by the receiving module 701. The processing module 702 may also be used to indicate a processing process in the network device (such as the first node or the RT 2) in any of the embodiments described above and/or another process of the technical solution described in this application. The apparatus may further include a storage module (not shown in FIG. 7), where the storage module is configured to store a context table and a primary/backup forwarding table. In a possible implementation, the apparatus 700 may be applied to a previous-hop node of the faulty node, for example, the first node in the embodiment corresponding to FIG. 2 or the RT 2 in the embodiments corresponding to FIG. 3 and FIG. 4.

For example, the apparatus 180 is applied to a first node. The receiving module 701 is configured to receive a first packet sent by a second node, where the second node is a previous-hop node of the first node on a primary path; the processing module 702 is configured to determine a difference between an initial value of a segment routing global block SRGB of the first node and an initial value of an SRGB of the third node when it is determined that a third node is faulty, where the third node is a next-hop node of the first node on the primary path; obtain a first label from the first packet, where the first label is determined based on the initial value of the SRGB of the third node and a node segment identifier of a fourth node, where the fourth node is a next-hop node of the third node on the primary path; use a sum of the first label and the difference as an incoming label of a backup path from the first node to the fourth node, and determine an outgoing label of the backup path from the first node to the fourth node from a backup forwarding table; and a sending module 703 is configured to send the first packet to the next-hop node of the first node on the backup path based on the outgoing label.

In a possible implementation, the first packet includes a label stack list used to provide guidance on forwarding of the first packet on the primary path.

The processing module 702 is specifically configured to obtain a second label from the top of the label stack list when determining the difference between the initial value of the SRGB of the first node and the initial value of the SRGB of the third node, where the second label is determined based on the node segment identifier of the third node and the initial value of the SRGB of the first node; determine, in the backup forwarding table, a first forwarding behavior corresponding to the second label, where the first forwarding behavior is used to indicate to search a label information table, and the label information table includes the difference corresponding to the second label; and obtain the difference from the label information table.

In a possible implementation, when obtaining the first label from the first packet, the processing module 702 is specifically configured to obtain the first label from the top of the label stack list from which the second label is popped after popping the second label on the top of the label stack list; the processing module 702 is further configured to switch the first label in the label stack list to the outgoing label, and the sending module 703 is specifically configured to send the updated first packet to a next-hop node of the first node on the backup path.

In a possible implementation, the sending module 703 is further configured to flood the network with a node segment identifier of the third node to another node before the receiving module 701 receives the first packet sent by the second node, and after the node segment identifier of the third node that is flooded in the network by the third node is received, where a priority of the node segment identifier of the third node flooded by the first node is lower than a priority of the node segment identifier of the third node flooded by the third node.

The first label is determined by the second node based on the node segment identifier of the third node and the initial value of the SRGB of the first node that are flooded by the first node.

In a possible implementation, the receiving module is further configured to receive indication information sent by the third network device after the fault recovers, where the indication information is used to indicate that the third network device cannot correctly forward a packet; and the sending module is further configured to send the second packet based on the determined outgoing label when the receiving module receives the second packet sent by the second network device.

Figure 4:
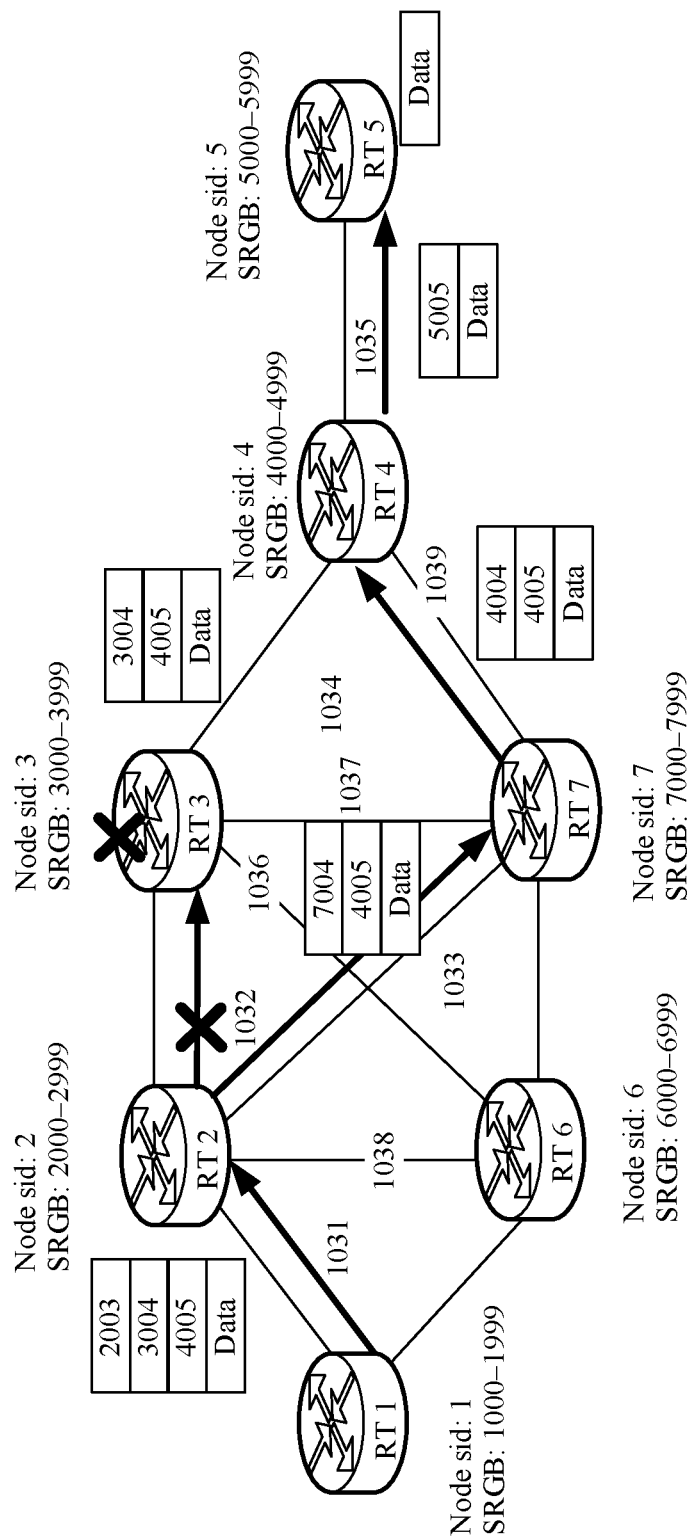
FIG. 4 is a schematic diagram of a method for processing a transmission path fault according to an embodiment of this application.

In a possible implementation, the apparatus 700 may be applied to a source node of a loose path segment, for example, the second node shown in FIG. 2, or the RT 1 in the embodiments corresponding to FIG. 3 and FIG. 4.

Using an application to a second node as an example, the receiving module 701 is configured to receive a node segment identifier of a third network device flooded in a network by a first network device, where the third network device is a neighboring network device of the first network device, and a priority of a node segment identifier of the third network device flooded by the first network device is lower than a priority of a node segment identifier of the third network device flooded by the third network device; a processing module 702 is configured to determine, in a process of sending a packet by using a primary path, that a fault occurs on the third network device, where the first network device is a next-hop network device of the second network device on the primary path, and the third network device is a next-hop network device of the first network device on the primary path; and a sending module 703 is configured to send the packet to the first network device over a backup path based on the node segment identifier of the third network device flooded by the first network device, where the first network device is a next-hop network device of the second network device on the backup path.

Figure 8:
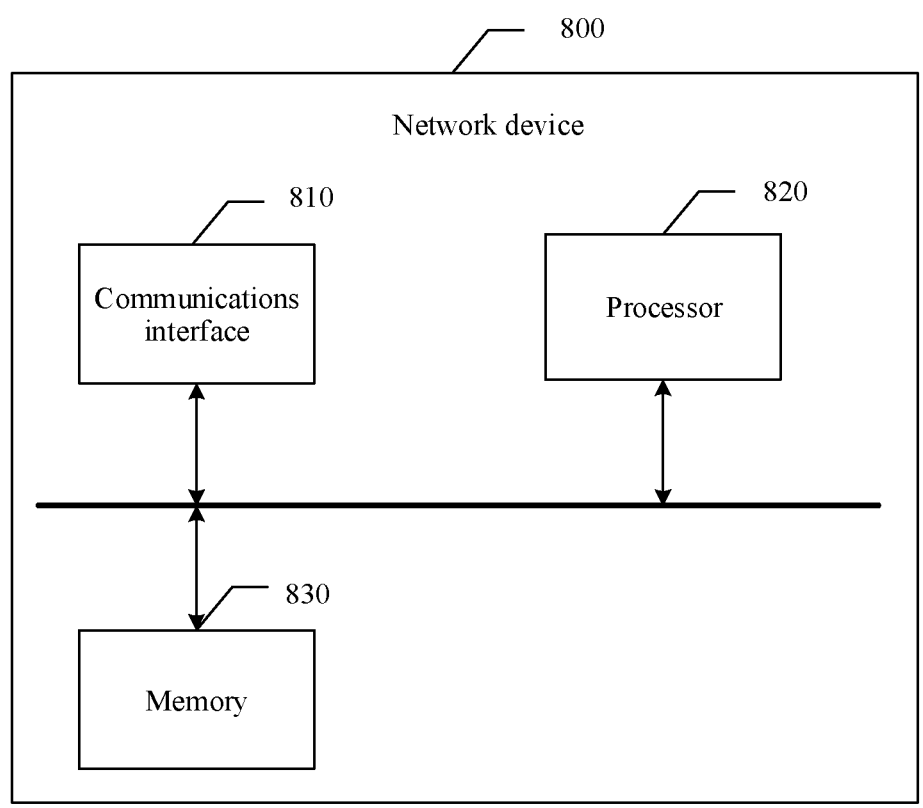
FIG. 8 is a schematic diagram of a structure of a network device 800 according to an embodiment of this application.

An embodiment of this application further provides a structure of a network device. As shown in FIG. 8, a network device 800 may include a communications interface 810 and a processor 820. Optionally, the network device 800 may further include a memory 830. The memory 830 may be disposed inside the network device, or may be disposed outside the network device. As shown in the FIG. 7, the processing module 702 is implemented by the processor 820. The receiving module 701 and the sending module 703 may be implemented by the communications interface 810.

In a possible implementation, the processor 820 receives and sends a packet or a message by using the communications interface 810, and is configured to implement any method performed by the node (the first node or the RT 2) in FIG. 2 to FIG. 4. During implementation, the steps of the process flow may implement the method performed by the first node or the RT 2 described in FIG. 2 to FIG. 4 through integrated logic circuitry of hardware or instructions in software in the processor 820. For brevity, details are not described herein again. Program code executed by processor 820 to implement the methods described above may be stored in memory 830. The memory 830 is coupled to the processor 820.

In a possible implementation, the processor 820 may receive and send a packet or a message by using the communications interface 810, and is configured to implement any method performed by the node (the second node or the RT 1) in FIG. 2 to FIG. 4. In implementation, the steps of the process flow may implement the method performed by the second node or the RT 1 described in FIG. 2 to FIG. 4 through integrated logic circuitry of hardware or instructions in software in the processor 820. For brevity, details are not described herein again. Program code executed by processor 820 to implement the methods described above may be stored in memory 830. The memory 830 is coupled to the processor 820.

Any communications interface in the embodiments of this application may be a circuit, a bus, a transceiver, or any other apparatus that may be configured to exchange information. For example, communication interface 810 in network device 800 may illustratively be a device connected to network device 800, such as a previous hop node or a next hop node of network device 800.

In the embodiments of this application, the processor may be a general processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in the embodiments of this application. The general purpose processor may be a microprocessor, any conventional processor, or the like. The steps of the method disclosed with reference to the embodiments of this application may be directly performed by a hardware processor, or may be performed by using a combination of hardware in the processor and a software module.

Couplings in the embodiments of this application are indirect couplings or communication connections between apparatuses, modules, or modules, may be electrical, mechanical, or another form, and are used for information interaction between the apparatuses, the modules, and the modules.

The processor 820 may operate with the memory 830 together. The memory 830 may be a nonvolatile memory, such as a hard disk drive (HDD) or a solid-state drive (SSD), or may be a volatile memory, for example, a random-access memory (RAM). The memory 830 is any other medium that can carry or store expected program code in a form of an instruction or a data structure and can be accessed by a computer, but is not limited thereto.

In this embodiment of this application, a specific connection medium between the communications interface 810, the processor 820, and the memory 830 is not limited. According to this embodiment of this application, in FIG. 8, the memory 830, the processor 820, and the communications interface 810 are connected to each other by using a bus. The bus is represented by using a bold line in FIG. 8. A manner of connection between other components is only schematically described, but is not used as a limitation. The bus may be classified into an address bus, a data bus, a control bus, and the like. For ease of representation, only one thick line is used to represent the bus in FIG. 8, but this does not mean that there is only one bus or only one type of bus.

Based on the foregoing embodiments, an embodiment of this application further provides a computer storage medium. The storage medium stores a software program, and when read and executed by one or more processors, the software program may implement the method provided in any one or more of the foregoing embodiments. The computer storage medium may include: any medium that can store program code, such as a removable hard disk, a read-only memory, a random access memory, a magnetic disk, or an optical disc.

Based on the foregoing embodiments, this embodiment of this application also provides a chip, where the chip includes a processor for implementing the functions in any one or more of the embodiments described above, for example for implementing the method performed by the first node or the RT 2 in FIG. 2 to FIG. 4, or for implementing the method performed by the second node or the RT 1 in FIG. 2 to FIG. 4. Optionally, the chip further includes a memory. The memory is configured to store a program instruction and data that are necessary and executed by the processor. The chip system may include a chip, or may include a chip and another discrete device.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method, comprising:
   receiving, by a first network device, a first packet sent by a second network device, wherein the second network device is a previous-hop network device of the first network device on a primary path;
   determining, by the first network device based on determining that a third network device is faulty, a difference between a first initial value of a first segment routing global block (SRGB) of the first network device and a third initial value of a third SRGB of the third network device, wherein the third network device is a next-hop network device of the first network device on the primary path;
   obtaining, by the first network device, a first label from the first packet, wherein the first label corresponds to a fourth network device that is a next-hop network device of the third network device on the primary path;
   determining, by the first network device, based on a sum value of the first label and the difference, a backup path from the first network device to the fourth network device; and
   sending, by the first network device, the first packet to a second next-hop network device of the first network device on the backup path.

2. The method according to claim 1, wherein the first label is determined based on the third initial value of the third SRGB of the third network device and a node segment identifier of the fourth network device.

3. The method according to claim 1, wherein the determining, by the first network device, based on the sum value of the first label and the difference, the backup path from the first network device to the fourth network device comprises:
   using, by the first network device, the sum value of the first label and the difference as an incoming label of the backup path, and
   determining, by the first network device, from a proxy forwarding table and a routing table, an outgoing label of the backup path from the first network device to the fourth network device.

4. The method according to claim 1, further comprising:
   flooding, by the first network device after receiving a node segment identifier of the third network device flooded in a network by the third network device, another network device in the network with the node segment identifier of the third network device,
   wherein the first label is determined by the second network device based on the node segment identifier of the third network device that is flooded by the first network device and the first initial value of the first SRGB of the first network device.

5. The method according to claim 1, further comprising:
   receiving, by the first network device, indication information sent by the third network device after fault recovery, wherein the indication information indicates that the third network device cannot correctly forward a packet; and
   sending, by the first network device when receiving a second packet sent by the second network device, the second packet on the backup path.

6. The method according to claim 1, the first packet including a label stack list that provides guidance on forwarding of the first packet on the primary path.

7. A first network device comprising:
   one or more memories configured to store instructions; and
   one or more processors coupled to the one or more memories and configured to execute the instructions to cause the first network device to:
   receive a first packet sent by a second network device, wherein the second network device is a previous-hop network device of the first network device on a primary path;
   determine a difference between first initial value of a first segment routing global block (SRGB) of the first network device and a third initial value of a third SRGB of a third network device based on determining that the third network device is faulty, wherein the third network device is a next-hop network device of the first network device on the primary path; obtain a first label from the first packet, wherein the first label corresponds to a fourth network device that is a next-hop network device of the third network device on the primary path; determine a backup path from the first network device to the fourth network device based on a sum value of the first label and the difference; and
   send the first packet to a second next-hop network device of the first network device on the backup path.

8. The first network device according to claim 7, wherein the first label is determined based on the third initial value of the third SRGB of the third network device and a node segment identifier of the fourth network device.

9. The first network device according to claim 7, wherein the one or more processors are further configured to execute the instructions to cause the first network device to:
   use the sum value of the first label and the difference as an incoming label of the backup path, and
   determine an outgoing label of the backup path from the first network device to the fourth network device from a proxy forwarding table and a routing table.

10. The first network device according to claim 7, wherein the one or more processors are further configured to execute the instructions to cause the first network device to:
    flood, after receiving a node segment identifier of the third network device flooded in a network by the third network device, another network device in the network with the node segment identifier of the third network device,
    wherein the first label is determined by the second network device based on the node segment identifier of the third network device that is flooded by the first network device and the first initial value of the first SRGB of the first network device.

11. The first network device according to claim 7, wherein the one or more processors are further configured to execute the instructions to cause the first network device to:
receive indication information sent by the third network device after fault recovery, wherein the indication information indicates that the third network device cannot correctly forward a packet; and
send, when receiving a second packet sent by the second network device, the second packet on the backup path.

12. The first network device according to claim 7, the first packet including a label stack list that provides guidance on forwarding of the first packet on the primary path.

13. A network system, comprising a first network device configured to:
receive a first packet sent by a second network device, wherein the second network device is a previous-hop network device of the first network device on a primary path;
determine a difference between a first initial value of a first segment routing global block (SRGB) of the first network device and a third initial value of a third SRGB of a third network device based on determining that the third network device is faulty, wherein the third network device is a next-hop network device of the first network device on the primary path;
obtain a first label from the first packet, wherein the first label corresponds to a fourth network device that is a next-hop network device of the third network device on the primary path; determine a backup path from the first network device to the fourth network device based on a sum value of the first label and the difference; and
send the first packet to a second next-hop network device of the first network device on the backup path.

14. The network system according to claim 13, wherein the first label is determined based on the third initial value of the third SRGB of the third network device and a node segment identifier of the fourth network device.

15. The network system according to claim 13, wherein the first network device is further configured to:
use the sum value of the first label and the difference as an incoming label of the backup path, and
determine an outgoing label of the backup path from the first network device to the fourth network device from a proxy forwarding table and a routing table.

16. The network system according to claim 13, wherein the first network device is further configured to:
flood, after receiving a node segment identifier of the third network device flooded in a network by the third network device, another network device in the network with the node segment identifier of the third network device,
wherein the first label is determined by the second network device based on the node segment identifier of the third network device that is flooded by the first network device and the first initial value of the first SRGB of the first network device.

17. The network system according to claim 13, wherein the first network device is further configured to:
receive indication information sent by the third network device after fault recovery, wherein the indication information indicates that the third network device cannot correctly forward a packet; and
send, when receiving a second packet sent by the second network device, the second packet on the backup path.

18. The network system according to claim 13, the first packet including a label stack list that provides guidance on forwarding of the first packet on the primary path.

* * * * *